US009424550B2

(12) United States Patent
Cai et al.

(10) Patent No.: US 9,424,550 B2
(45) Date of Patent: Aug. 23, 2016

(54) CHARGING FOR OPERATOR-ASSISTED SESSIONS IN IMS NETWORKS

(75) Inventors: Yigang Cai, Naperville, IL (US); Xiangyang Li, Beijing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1045 days.

(21) Appl. No.: 12/994,368

(22) PCT Filed: Jun. 18, 2008

(86) PCT No.: PCT/US2008/067334
§ 371 (c)(1),
(2), (4) Date: Nov. 23, 2010

(87) PCT Pub. No.: WO2009/154622
PCT Pub. Date: Dec. 23, 2009

(65) Prior Publication Data
US 2011/0078061 A1    Mar. 31, 2011

(51) Int. Cl.
*G06Q 10/10* (2012.01)
*H04L 12/14* (2006.01)
(Continued)

(52) U.S. Cl.
CPC ............. *G06Q 10/10* (2013.01); *G06Q 40/12* (2013.12); *H04L 12/14* (2013.01);
(Continued)

(58) Field of Classification Search
CPC ...... G06Q 40/12; G06Q 40/10; G06Q 40/02; G06Q 10/10; G06Q 30/04
USPC .......................................................... 705/30
See application file for complete search history.

(56) References Cited

U.S. PATENT DOCUMENTS 6,731,625 B1 * 5/2004 Eastep .................... H04L 29/06
                                                              370/352
7,221,929 B2 * 5/2007 Lee et al. ...................... 455/408
(Continued)

FOREIGN PATENT DOCUMENTS

CN      1885779 A     12/2006
CN    101009691 A      8/2007
(Continued)

OTHER PUBLICATIONS

Zhang, Li Jun. Fast and seamless mobility management in IPv6-based next-generation wireless networks. Ecole Polytechnique, Montreal (Canada), ProQuest Dissertations Publishing, 2008.*
(Continued)

*Primary Examiner* — Ryan Zeender
*Assistant Examiner* — Fawaad Haider
(74) *Attorney, Agent, or Firm* — Duft Bomsen & Fettig, LLP

(57) ABSTRACT

IMS networks and methods are disclosed for charging for operator-assisted sessions. To perform the charging, an operator assistance application server (AS) acts as an interface between an operator system (legacy or IMS) and charging systems for the IMS network. When an operator-assisted session is initiated in the IMS network, the operator assistance AS receives a session initiation message in SIP, and transmits the session initiation message to the operator system to allow the operator system to collect charging information from an end user. The operator assistance AS then receives a service request message from the operator system that includes the collected charging information, and detects a charging event. The operator assistance AS generates a Diameter charging request message, maps the charging information from the service request message to the Diameter charging request message, and transmits the Diameter charging request message to a charging system to charge for the operator-assisted session.

10 Claims, 7 Drawing Sheets

(51) Int. Cl.
*H04M 15/00* (2006.01)
*H04M 15/08* (2006.01)
*H04W 4/24* (2009.01)
*G06Q 40/00* (2012.01)
*H04M 3/493* (2006.01)

(52) U.S. Cl.
CPC ...... *H04L 12/1403* (2013.01); *H04L 12/1446* (2013.01); *H04M 15/00* (2013.01); *H04M 15/08* (2013.01); *H04M 15/57* (2013.01); *H04M 15/63* (2013.01); *H04M 15/8292* (2013.01); *H04W 4/24* (2013.01); *H04M 3/4933* (2013.01); *H04M 2215/208* (2013.01); *H04M 2215/62* (2013.01)

(56) References Cited

U.S. PATENT DOCUMENTS

| | | | |
|---|---|---|---|
| 7,869,787 B2* | 1/2011 | Koskinen et al. | 455/406 |
| 8,036,211 B1* | 10/2011 | Leeder et al. | 370/353 |
| 2007/0213031 A1* | 9/2007 | Ejzak et al. | 455/406 |
| 2009/0129372 A1* | 5/2009 | Pandey | G06Q 30/0267 370/352 |
| 2010/0217855 A1* | 8/2010 | Przybysz et al. | 709/223 |

FOREIGN PATENT DOCUMENTS

| | | |
|---|---|---|
| DE | 102005001905 A1 | 7/2006 |
| WO | WO 2004015975 A | 2/2004 |

OTHER PUBLICATIONS

Haluska et al., "Considerations for Information Services, and Operator Services Using SIP; draft-halluska-sipping-directory-assistance-05.txt" Considerations for Information Services and Operator Services Using SIP; draft-halluska-sipping-directory-assistance-05.txt, Internet Engineering Task Force, IETF, StandardWorkingDraft, Internet Society (ISOC) 4, Rue Des Falaises CH-1205 Geneva, Swit, No. 5, May 8, 2008, XP015057744, all pages.

J. Haluska et al., "Considerations for Information Services and Operator Services Using SIP," Network Working Group, Internet Draft, Intended status: Informational , May 8, 2008.

* cited by examiner

CHARGING FOR OPERATOR-ASSISTED SESSIONS IN IMS NETWORKS

BACKGROUND OF THE INVENTION

1. Field of the Invention

The invention is related to the field of communication networks and, in particular, to performing charging for operator-assisted sessions in IMS networks.

2. Statement of the Problem

An operator-assisted call is a type of call that requires an operator to provide some form of assistance. Typical operator-assisted calls include collect calls (or reverse charge calls), calls billed to a credit card or a third party, calls made from pay phones, calls placed station-to-station, calls placed person-to-person, certain international calls which cannot be dialed directly, etc. In a legacy network, such as a PSTN, a switch serving a call identifies the call as an operator-assisted call, and then routes the call to an operator system by transmitting an SS7 message (i.e., an ISUP message) to the operator system. The operator system may comprise a call center that has one or more operator stations. The operator station (also referred to as an attendant console) receives the SS7 message, and displays the relevant information to the telephone operator. For example, the operator station may display a screen indicating the calling party number, the called party number (if any), a billing number or other charging information, etc. The telephone operator then converses with the calling party to determine what type of service is requested or needed by the calling party, and collects any other needed charging information. For example, if the call is a collect call, then the operator may collect the called number from the calling party, which is the number that may be charged for the call.

If the party being charged for the call has subscribed to prepaid charging, then the operator station transmits an INAP message to a Service Control Point (SCP) to get authorization to perform the requested service. The INAP message includes the relevant charging information indicating the party who will be charged for the call. The SCP then determines whether the call may be charged to the party indicated in the charging information, and returns an INAP message to the operator station either authorizing or rejecting the service. For example, the SCP may query a prepaid server in the legacy network to determine whether the party being charged has a sufficient balance, the SCP may query a credit card system to determine whether a credit card may be charged for the service, etc. If the service is authorized, then the operator station initiates the service requested by the calling party, such as connecting the call to another party. The operator station may still need further authorization before performing the service, such as receiving authorization from a called party to accept billing for the call. The SCP further communicates with the prepaid server to perform charging for the operator-assisted call.

If the party being charged for the call has subscribed to postpaid charging, then the operator station initiates the service requested by the calling party, such as connecting the call to another party. The operator station may need further authorization before performing the service, such as receiving authorization from a called party to accept the billing for the call. After the call has ended, the operator station may generate a Call Detail Record (CDR) for the service provided during the call, and then transmit the CDR to a billing system in the legacy network. The switch that is serving the call may also generate a CDR for the call and transmit the CDR to the billing system. The billing system may then bill for the operator-assisted call.

One type of communication network gaining popularity is an IP Multimedia Subsystem (IMS) network. As set forth in the 3rd Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

When legacy communication networks are upgraded to IMS networks, the service providers may continue using the presently-deployed legacy operator systems for years to handle operator-assisted calls placed over the IMS network. Operator-assisted calls are generally referred to as operator-assisted sessions in IMS networks, as the sessions may be voice, data, multimedia, etc. Unfortunately, legacy operator systems are not adapted to communicate with IMS networks to either perform services for the operator-assisted sessions, or to charge for the provided services. Also, the legacy operator systems may ultimately be replaced by IMS operator systems. Unfortunately, present 3GPP and IMS standards have not defined the IMS operator systems or how charging would be performed for services provided for operator-assisted sessions.

SUMMARY OF THE SOLUTION

Embodiments of the invention include systems and methods of performing charging for operator-assisted sessions in IMS networks. To perform the charging, an operator assistance application server (AS) in the IMS network acts as an interface between an operator system (legacy or IMS) and charging systems for the IMS network. For example, the operator assistance AS interfaces the operator system with an Online Charging System (OCS) in the IMS network, and interfaces the operator system with an Offline Charging System (OFCS) in the IMS network. The charging systems in IMS networks use Diameter interfaces. Thus, the operator assistance AS is able to convert between the messaging used by the operator system and the Diameter interface of the charging systems.

When the operator system collects charging information for an operator-assisted session, the operator system transmits the charging information to the operator assistance AS in a service request message. The operator assistance AS includes a charging function that triggers on the service request message, and transmits the appropriate Diameter charging request message to one of the charging systems. The charging system may then authorize a service for the operator-assisted session, and charge for the provided service. Because the operator assistance AS acts as a charging interface between an operator system and charging systems in the IMS network, legacy operator systems may advantageously be used with IMS networks. Thus, as IMS networks are implemented as the core network for service providers, the legacy operator systems may be used for several years with the IMS networks to provide assistance to IMS end users. Also, as IMS-compliant operator systems are developed, the operator assistance AS may act as a charging interface toward the charging systems so that a Charging Trigger Function (CTF) and Diameter interfaces do not need to be implemented in the IMS operator systems.

One embodiment of the invention comprises an operator assistance AS that is implemented in an IMS network. The operator assistance AS includes an interface system operable to receive a session initiation message in Session Initiation Protocol (SIP) for an operator-assisted session in the IMS network. The interface system is further operable to transmit the session initiation message to an operator system to allow the operator system to collect charging information from an end user of the operator-assisted session. The interface system is further operable to receive a service request message from the operator system that includes the collected charging information. The charging function is operable to detect a charging event responsive to receiving the service request message, and to generate a Diameter charging request message. The charging function is further operable to map the charging information from the service request message to the Diameter charging request message, and to transmit the Diameter charging request message to a charging system in the IMS network. The charging system, whether it be an OCS or an OFCS, authorizes the service to be provided for the session, and performs the appropriate charging for the session.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
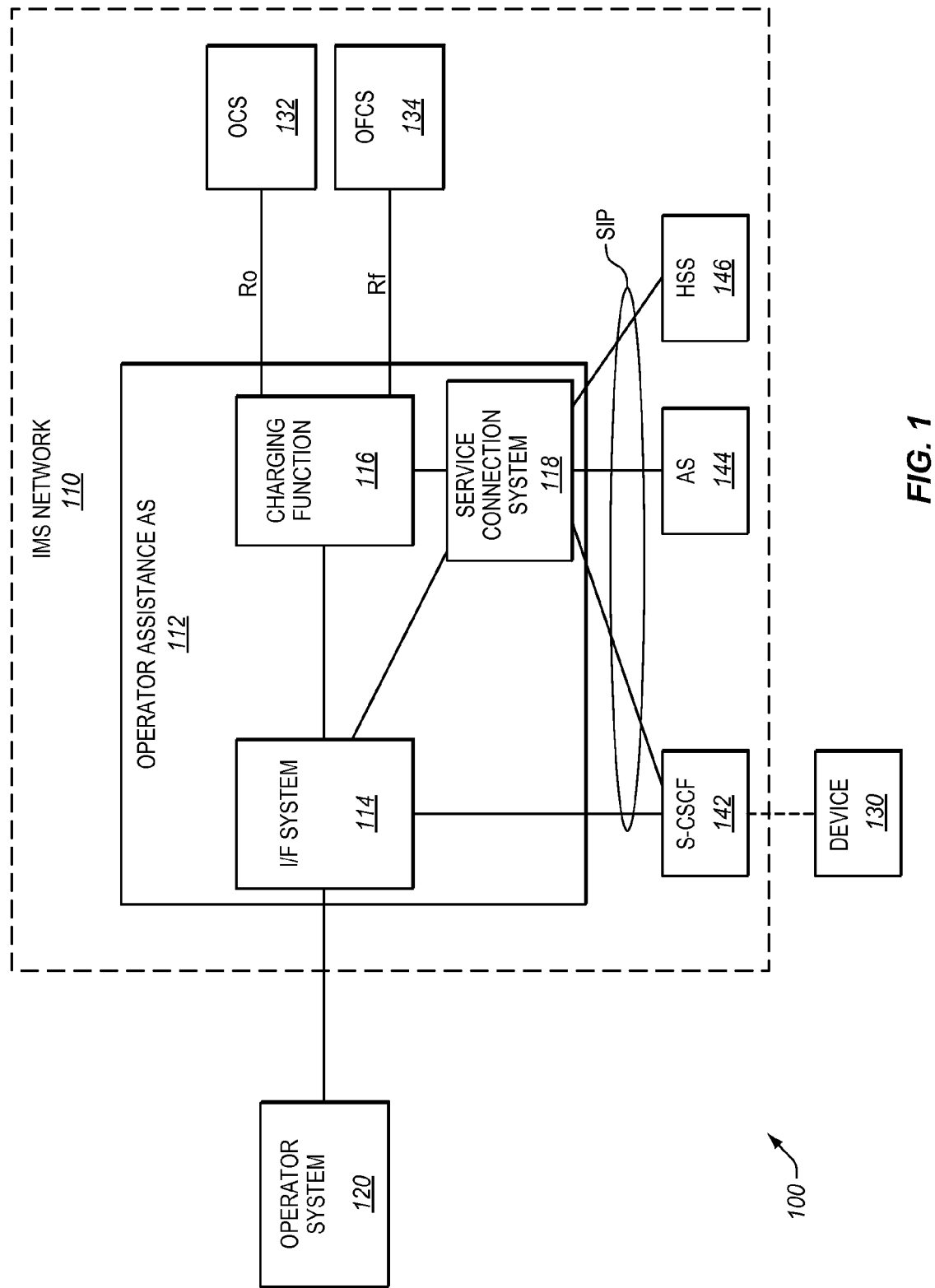
FIG. 1 illustrates a communication network in an exemplary embodiment of the invention.

FIG. 1 illustrates a communication network 100 in an exemplary embodiment of the invention. Communication network 100 includes an IMS network 110 and an operator system 120. IMS network 110 includes an operator assistance application server (AS) 112, an Online Charging System (OCS) 132, an Offline Charging System (OFCS) 134, and a plurality of other network elements. The network elements include one or more Serving-Call Session Control Functions (S-CSCF) 142, one or more other application servers 144, and a Home Subscriber Server (HSS) 146. Operator assistance AS 112 connects to OCS 132 over a Diameter Ro interface (also referred to as the Diameter Ro reference point). Operator assistance AS 112 also connects to OFCS 134 over a Diameter Rf interface (also referred to as the Diameter Rf reference point).

Operator assistance AS 112 comprises any server or system operable to perform charging trigger functions for services provided for operator-assisted sessions over IMS network 110. Operator assistance AS 112 includes an interface system 114, a charging function 116, and a service connection system 118. Interface system 114 comprises any system, function, or component operable to communicate with operator system 120 according to the signaling or messaging protocol used by operator system 120. For example, if operator system 120 comprises a legacy operator system, then the signaling or messaging protocol may be SS7 (i.e., ISUP). If operator system 120 comprises an IMS operator system, then the signaling or messaging protocol may be Session Initiation Protocol (SIP), XML, HTTP, etc. Interface system 114 is also operable to communicate with network elements in IMS network 110 according to the signaling or messaging protocol used in IMS network 110, which is typically SIP. Charging function 116 comprises any system, function, or component operable to identify charging events, and then communicate with OCS 132 and OFCS 134 to perform charging for these charging events. Service connection system 118 comprises any system, function or component operable to connect sessions to network elements in IMS network 110, such as AS 144 and S-CSCF 142, so that the network elements may perform services.

Operator system 120 comprises any system, server, or function operable to provide assistance to an end user of a communication device 130 for a session placed over IMS network 110. Operator system 120 may include one or more operator stations (not shown), such as a PC and a telephone, and telephone operators that use the operator stations to provide assistance for sessions. Operator system 120 may comprise a legacy operator system that is typically used in legacy communication networks, such as a PSTN. Operator system 120 may alternatively comprise an IMS operator system that is newly developed for IMS networks.

In this embodiment, assume that a user of communication device 130 initiates a session over IMS network 110. S-CSCF 142 receives a SIP message for the session. For one of a variety of reasons, S-CSCF 142 determines that operator assistance is needed or desired for the session. One reason for the operator assistance may be that the user of device 130 requested the assistance, such as for a credit card session or another third party charging session, a person-to-person session, etc. Another reason may be that the session is identified as a reverse charge session (i.e., a collect call). When S-CSCF 142 identifies the reverse charge session, S-CSCF 142 will route the session to operator system 120. Operator system 120 will then verify whether the called party agrees to pay for the session. Another reason may be that unclear charging information was collected for the session. In this scenario, S-CSCF 142 will route the session to operator system 120. Another reason may be that Interactive Voice Response (IVR) failed for the session. When IVR collects digits for the session but the voice was not recognized or an account number or PIN is incorrect, S-CSCF 142 will route the session to operator system 120 who re-collects the information.

Figure 2:
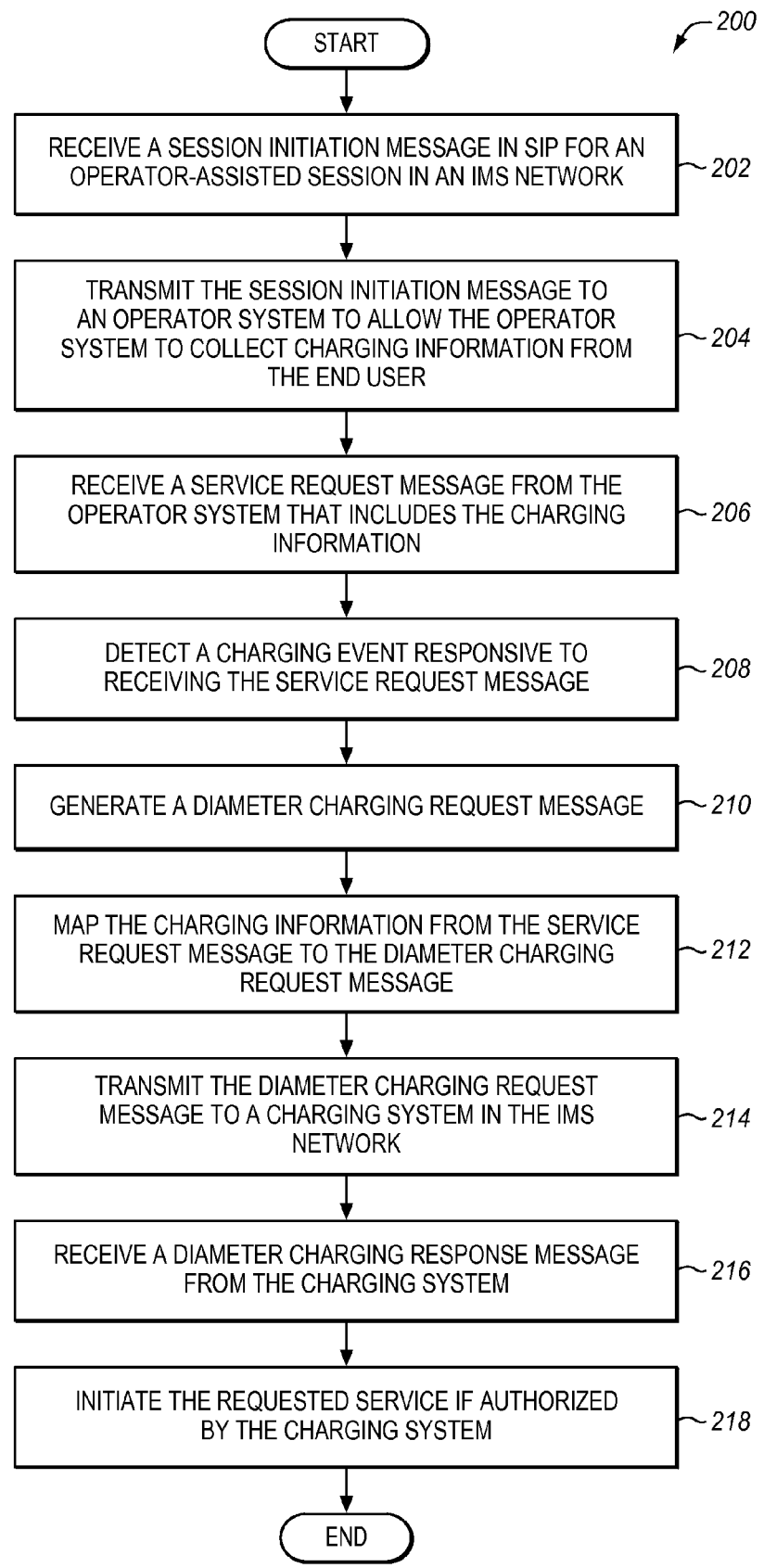
FIG. 2 is a flow chart illustrating a method of performing charging for operator-assisted sessions in an exemplary embodiment of the invention.

When operator assistance is needed or desired for the session, the session is routed to operator system 120. S-CSCF 142 may route a session initiation message in SIP for the session to operator assistance AS 112, which in turn routes a session initiation message to operator system 120 in the appropriate protocol (i.e., SS7 for legacy operator system or SIP for IMS operator system). Alternatively, S-CSCF 142 may route the SIP session initiation message to a gateway (not shown) which in turn routes a session initiation message to operator system 120 in the appropriate protocol. FIG. 2 illustrates how operator assistance AS 112 handles the operator-assisted session when the SIP message is routed to operator assistance AS 112.

FIG. 2 is a flow chart illustrating a method 200 of performing charging for operator-assisted sessions in an exemplary embodiment of the invention. The steps of method 200 will be described with reference to communication network 100 in FIG. 1. The steps of the flow chart in FIG. 2 are not all inclusive and may include other steps not shown.

In step 202 of method 200, interface system 114 receives the session initiation message in SIP for the operator-assisted session from S-CSCF 142. In step 204, interface system 114 transmits the session initiation message to operator system 120. Interface system 114 may convert the session initiation message from SIP to another protocol before transmitting to operator system 120. For example, if operator system 120 comprises a legacy operator system that typically communicates through SS7 signaling, then interface system 114 is able to convert the session initiation message from SIP to SS7. If operator system 120 comprises an IMS operator system that communicates through SIP, then interface system 114 does not need to convert the session initiation message.

Figure 3:
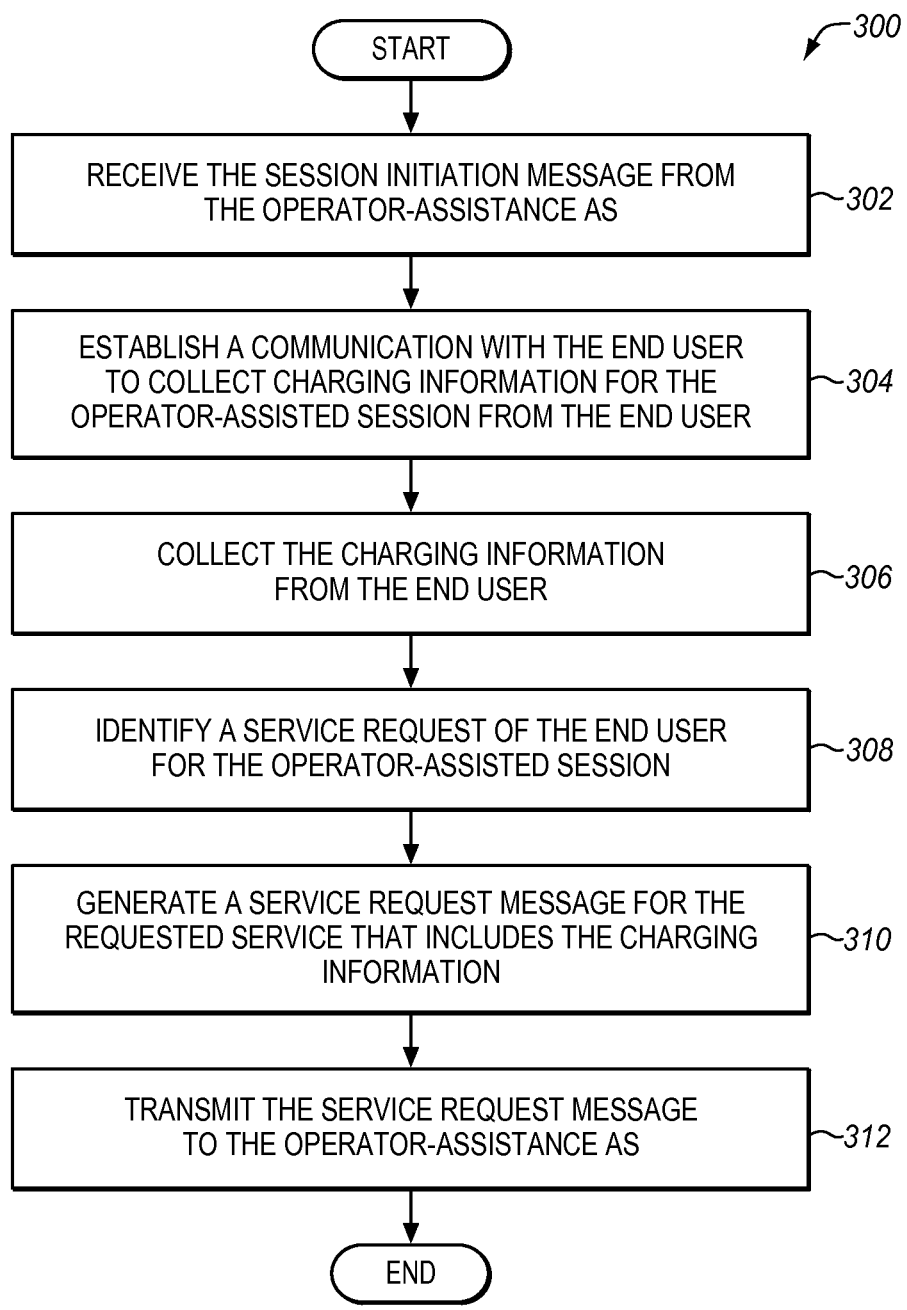
FIG. 3 is a flow chart illustrating a method of performing assistance for a session in an exemplary embodiment of the invention.

Upon receiving the session initiation message for the operator-assisted session, operator system 120 performs traditional or newly-developed techniques or processes to assist the end user. FIG. 3 is a flow chart illustrating a method 300 of performing assistance for a session in an exemplary embodiment of the invention. The steps of method 300 will be described with reference to communication network 100 in FIG. 1. The steps of the flow chart in FIG. 3 are not all inclusive and may include other steps not shown.

In step 302 of method 300, operator system 120 receives the session initiation message in the appropriate protocol. In step 304, operator system 120 establishes a communication with the end user through device 130 to collect charging information and other information for the session. For example, operator system 120 may establish a voice call with the end user, may send an email, Instant Message (IM), text message, or multimedia message to the end user, or otherwise establish a communication with the end user.

In step 306, operator system 120 collects charging information and other information from the end user. For example, if the end user wants to initiate a credit card session, then operator system 120 may communicate with the end user to collect the credit card number for the session. If the end user wants to initiate a third party charging session, then operator system 120 may communicate with the end user to collect the directory number for the third party that will be charged for the session. Operator system 120 may also collect charging information from the other sources, such as HSS 146. When S-CSCF 142 first receives the session initiation message for the session, S-CSCF 142 may query HSS 146 for charging information for the session, and include the charging information in the session initiation message that is received by operator system 120.

In step 308, operator system 120 identifies a service request of the end user for the session. Examples of the service request include connecting the session to another party, connecting the session to AS 144 so that end user may perform an action such as changing parental controls on sessions over IMS network 110, etc. In step 310, operator system 120 generates a service request message for the requested service. The service request message includes the charging information collected by operator system 120. In step 312, operator system 120 transmits the service request message to operator assistance AS 112.

In FIG. 2, interface system 114 receives the service request message from operator system 120 in step 206. In step 208, charging function 116 detects a charging event responsive to receiving the service request message. Charging function 116 acts as an online or offline Charging Trigger Function (CTF). Thus, charging function 116 triggers on particular events in operator assistance AS 112. When a charging event is detected, charging function 116 generates a Diameter charging request message in step 210, as Diameter is the reference point between operator assistance AS 112 and the charging systems 132 and 134. In step 212, charging function 116 maps the charging information from the service request message to the Diameter charging request message. For example, if the service request message comprises an SS7 INAP message (from a legacy operator system), then charging function 116 maps charging information from the INAP message to Attribute Value Pairs (AVP) in the Diameter charging request message. If the service request message comprises an XML or HTTP message (from an IMS operator system), then charging function 116 maps charging information from the XML or HTTP message to AVPs in the Diameter charging request message. In step 214, charging function 116 transmits the Diameter charging request message to charging system 132 or charging system 134.

Figure 4:
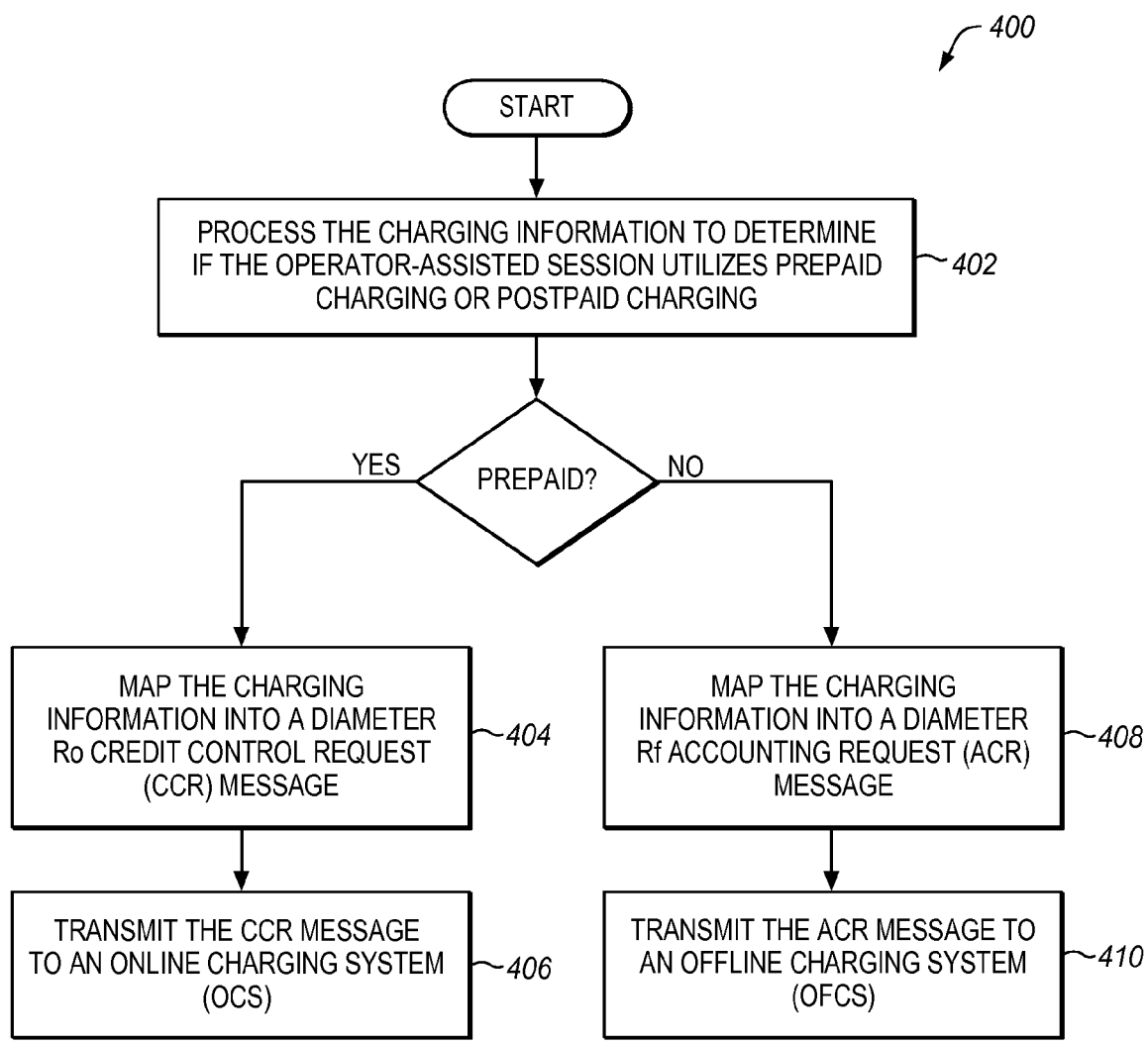
FIG. 4 is a flow chart illustrating a more detailed method of providing a Diameter charging request message to a charging system in an exemplary embodiment of the invention.

FIG. 4 is a flow chart illustrating a more detailed method 400 of providing a Diameter charging request message to a charging system in an exemplary embodiment of the invention. In step 402, charging function 116 processes the charging information to determine if the operator-assisted session utilizes prepaid charging or postpaid charging. If prepaid charging is utilized, then charging function 116 maps the charging information into a Diameter Ro Credit Control Request (CCR) message in step 404. Charging function 116 then transmits the CCR message to OCS 132 in step 406. If postpaid charging is utilized, then charging function 116 maps the charging information into a Diameter Rf Accounting Request (ACR) message in step 408. Charging function 116 then transmits the ACR message to OFCS 134 in step 410.

The Diameter Ro CCR message is used to debit the cost of a service or services supplied for the operator-assisted session from online charging accounts (i.e., prepaid, credit card, calling card, etc). The Diameter Ro CCR message may be for Immediate Event Charging (IEC) or Event Charging with Unit Reservation (ECUR). After receiving a Diameter Ro CCR message, OCS 132 operates as follows. For IEC, OCS 132 rates the service being provided based on the tariff of operator-assisted session, and deducts the cost of the service from the account balance of the party being charged. If the account balance is sufficient for the cost of the service, then OCS 132 determines that the service is authorized. If the account balance is insufficient, then OCS 132 determines that the service is rejected.

For ECUR, OCS 132 rates the service being provided based on the tariff of operator-assisted session, and reserves a credit from the account balance based on the estimated cost for the service. If the account balance is sufficient for the credit being reserved, then OCS 132 determines that the service is authorized. If the service is subsequently performed, then OCS 132 will deduct the reserved credit from the account balance. If the service is not subsequently performed, then OCS 132 will refund the reserved credit to the account balance. If the account balance is not sufficient for the credit being reserved, then OCS 132 determines that the service is rejected.

The Diameter Rf ACR message is used to debit the cost of a service or services supplied for the operator-assisted session from offline charging accounts. OFCS 134, which may include a Charging Data Function (CDF) and Charging Gateway Function (CGF), or a Charging Collector Function (CCF), processes the ACR message and generates a Charging Data Record (CDR).

In either case, OCS 132 or OFCS 134 generates a Diameter charging response message indicating whether the requested service is authorized or rejected. The Diameter charging response message may also indicate charging information for the session, such as a charging rate, a tariff, an account balance, etc. If OCS 132 generates the Diameter charging response message, then the Diameter charging response message comprises a Diameter Ro Credit Control Answer (CCA) message. If OFCS 134 generates the Diameter charging response message, then the Diameter charging response message comprises a Diameter Rf Accounting Answer (ACA) message.

In FIG. 2, charging function 116 receives the Diameter charging response message from the charging system 132 or 134 in step 216. The Diameter charging response message indicates whether the request service for the operator-assisted session is authorized or rejected. Service connection system 118 may terminate the operator-assisted session if the rejected by the charging system. If authorized by the charging system, service connection system 118 initiates the requested service in step 218. To initiate the requested service, service connection system 118 may connect device 130 of the end user to various application servers 144 or other network elements (e.g., S-CSCF 142) which will provide the resource usage or the network service to the end user. For example, service connection system 118 may transmit another service request message to a network element in IMS network 110 that is adapted to provide the requested service for the operator-assisted session. Service connection system 118 is able to communicate with the network elements using SIP in order to join the network elements into the operator-assisted session.

Because operator assistance AS 112 acts as a charging interface between operator system 120 and charging systems 132 and 134 in IMS network 110, legacy operator systems may advantageously be used with IMS network 110. Thus, as IMS networks are implemented as the core network for service providers, the legacy operator systems may be used for several years with the IMS networks to provide assistance to IMS end users. The legacy operator systems may not even know they are interfacing with an IMS network as legacy signaling, such as INAP and ISUP, may be used by the legacy operator system in communicating with operator assistance AS 112.

Also, as IMS-compliant operator systems are developed, operator assistance AS 112 may act as a charging interface toward the charging systems 132 and 134 so that a Charging Trigger Function (CTF) and Diameter interfaces do not need to be implemented in the IMS operator systems. For example, IMS operator systems may use XML messages or HTTP messages toward operator assistance AS 112. Operator assistance AS 112 may then act as a CTF and Diameter interface for multiple IMS operator systems.

Figure 5:
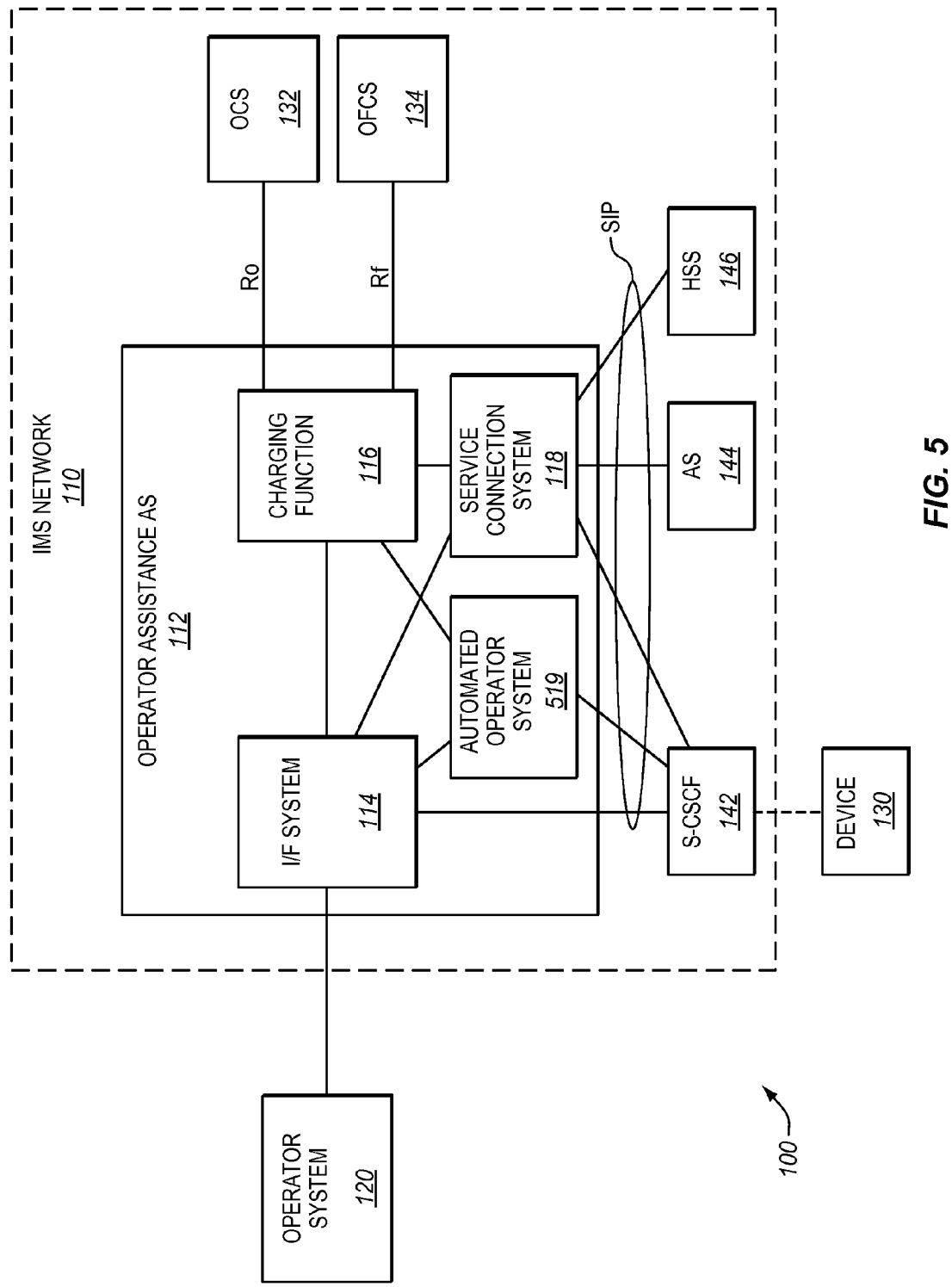
FIG. 5 illustrates a communication network in another exemplary embodiment of the invention.

FIG. 5 illustrates communication network 100 in another exemplary embodiment of the invention. In this embodiment, operator assistance AS 112 further includes an automated operator system 519. Automated operator system 519 comprises any system, server, or function operable to automatically collect charging information and other information from the end user instead of having operator system 120 collect the charging information. Automated operator system 519 may include Interactive Voice Response (IVR) technology which allows automated operator system 519 to play pre-recorded or dynamically generated audio to an end user, and to detect voice and touch tones provided by the end user. When an operator-assisted session is initiated in IMS network 110, charging information may be collected by operator system 120 (i.e., through a live telephone operator), or by automated operator system 519.

When interface system 114 receives the session initiation message for the operator-assisted session (see step 202 of FIG. 2), interface system 114 determines whether to have the telephone operator serve the session or to use automated operator system 519. Interface system 114 may process a variety of rules or policies to determine whether to have the telephone operator serve the session or to use automated operator system 519. In one example, interface system 114 may use automated operator system 519 as a default to save cost. Automated operator system 519 may then provide a menu to the end user that allows the end user to choose between the automated operator or the live operator. For example, the menu provided by automated operator system 519 may state "press '1' for automatic assistance and press '2' for operator assistance". If automatic assistance is selected, then the end user may also be able to access the live operator at anytime by pressing '0' or '*'. In another example, interface system 114 may access a subscriber profile for the end user (from S-CSCF 142 or HSS 146) to determine whether the end user has selected automatic assistance or operator assistance based pre-provisioned criteria. The criteria may include: (1) if IVR fails, then the session is routed to the live operator; (2) if the session is to be charged to a credit card, then the end user may not trust the automated operator system 519 for security reason so the session is routed to the live operator; (3) if the session comprises a 1-800 call, then the end user may request a live operator. Multiple other examples of criteria may be pre-provisioned by the end user to define whether sessions are served by automated operator system 519 or the telephone operator.

If the determination is to have the telephone operator serve the session, then interface system 114 transmits the session initiation message to operator system 120 as described in step 204 of FIG. 2. If the determination is to have automated operator system 519 serve the session, then interface system 114 transmits the session initiation message (or another type of message) to automated operator system 519. The session initiation message involves automated operator system 519 in the session.

Responsive to receiving the session initiation message, automated operator system 519 communicates with the end user through voice (e.g., IVR), email, text message, multimedia message, etc. In communicating with the end user, automated operator system 519 prompts the end user for the charging information. For example, automated operator system 519 may generate a voice message requesting the charging information, and then play the voice message to the end user. Alternatively, automated operator system 519 may generate a multimedia message requesting the charging information. Automated operator system 519 then collects the charging information from the end user. Automated operator system 519 also prompts the end user for a service request for the message (much in the same way the telephone operator would identify the service request). Automated operator system 519 then transmits a service request message to charging function 116 that includes the charging information. Charging function 116 then operates as described in steps 208-216 in FIG. 2 responsive to receiving the service request message from automated operator system 519.

EXAMPLES

Figure 6:
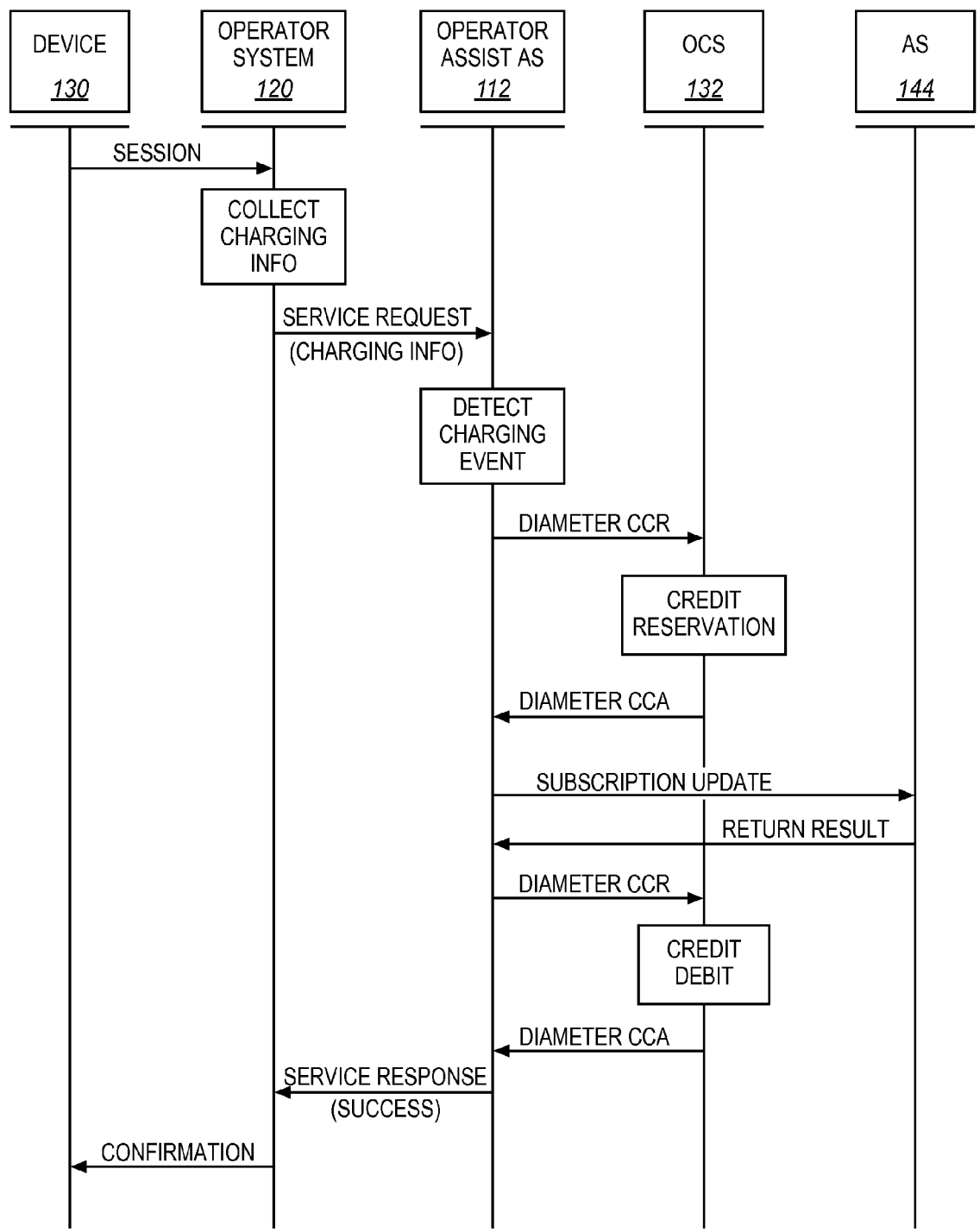
FIG. 6 is a message diagram illustrating an operator-assisted session in an IMS network in an exemplary embodiment of the invention.

FIG. 6 is a message diagram illustrating an operator-assisted session in IMS network 110 in an exemplary embodiment of the invention. The message diagram illustrates SIP and Diameter messaging used within IMS network 110. Assume that an end user of device 130 (see also FIG. 1) initiates an operator-assisted session in IMS network 110. To initiate the session, device 130 generates a SIP INVITE and transmits the INVITE to S-CSCF 142 through the appropriate access network. S-CSCF 142 receives the INVITE, and determines that the session comprises an operator-assisted session. Again, the end user may specifically request an operator-assisted session by initiating a collect call, initiating a credit card call, etc. Also, S-CSCF 142 may determine that the present call has failed for some reason, and consequently determines that operator assistance is needed to complete the session. In either event, S-CSCF 142 routes the INVITE message to operator assistance AS 112.

Responsive to receiving the INVITE, interface system 114 (see FIG. 1) transmits a session initiation message to operator system 120. The session initiation message may be in SIP, or may be in another protocol. For example, if operator system 120 comprises a legacy operator system that typically communicates through SS7 signaling, then interface system 114 converts the SIP INVITE to an SS7 initiation message, such as an Initial Address Message (IAM). If operator system 120 comprises an IMS operator system that communicates through SIP, then interface system 114 does not need to convert the INVITE to another protocol, and merely forwards the INVITE to operator system 120. All of this messaging connects the session from device 130 to operator system 120, and is illustrated in FIG. 6 as an arrow labeled "session".

Operator system 120 typically includes an operator terminal that is being operated by a live telephone operator. The operator terminal processes the session information included in the session initiation message, and displays the session information to the telephone operator. For example, the operator terminal may generate a screen that displays the calling party number, the called party number, the billing number and other charging information, and/or other session information. The charging information that is initially displayed is automatically collected upon initiation of the session. For instance, when S-CSCF 142 receives the INVITE, S-CSCF 142 may access local databases to identify charging information for the end user, or may access HSS 146 to collect the charging information. S-CSCF 142 then inserts the charging information in the INVITE.

The telephone operator then establishes a communication with the end user through the operator terminal to collect charging information and other information for the session. For example, the telephone operator may establish a voice call with the end user, may send an email, Instant Message (IM), text message, or multimedia message to the end user, or otherwise establish a communication with the end user. Upon collecting the charging information, the telephone operator enters the charging information into the operator terminal. In entering the charging information, the telephone operator is able to manually overwrite some or all of the originally-displayed charging information based on the information collected from the end user.

In addition to collecting the charging information, the telephone operator also identifies a service request of the end user for the session. For example, assume for this embodiment that the end user is requesting to update his/her subscription for service in IMS network 110, such as to add text messaging, to change parental control, to activate call forwarding, etc. The telephone operator then enters the appropriate commands into the operator terminal, and the operator terminal generates a service request message for the requested subscription update. The service request message includes the charging information collected for the session. The operator terminal then transmits the service request message to operator assistance AS 112.

Interface system 114 (see FIG. 1) in operator assistance AS 112 receives the service request message from operator system 120. Charging function 116 detects a charging event responsive to receiving the service request message. Charging function 116 processes the charging information in the service request message to determine if the operator-assisted session utilizes prepaid charging or postpaid charging. Assume for this embodiment that prepaid charging is utilized for the operator-assisted session (i.e., the end user has a prepaid charging account, calling card, or debit account). For prepaid charging, charging function 116 maps the charging information from the service request message into a Diameter Ro CCR message, and transmits the CCR message to OCS 132.

If Event Charging with Unit Reservation (ECUR) is used in OCS 132 as in this embodiment, then OCS 132 rates the service being provided based on the tariff of the operator-assisted session, and reserves a credit from the account balance based on the estimated cost for the service. If the account balance is sufficient for the credit being reserved, then OCS 132 determines that the service is authorized. OCS 132 generates a Diameter Ro CCA message indicating the charging information for the session, such as a charging rate, a tariff, an account balance, etc, and also indicating that the service is authorized. OCS 132 then transmits the CCA message to operator assistance AS 112.

When the service is authorized, operator assistance AS 112 transmits one or more subscription update messages to AS 144 to change the subscription as desired by the end user. When the request is successfully fulfilled, AS 144 transmits a successful return result to operator assistance AS 112. Charging function 116 will again detect a charging event based on the return result from AS 144. Thus, charging function 116 generates another Diameter Ro CCR message, and transmits the CCR message to OCS 132. Responsive to the CCR message, OCS 132 deducts the reserved credit from the account balance of the end user. OCS 132 then generates another Diameter Ro CCA message indicating that charging was successful, and transmits the CCA message to operator assistance AS 112. Operator assistance AS 112 then transmits a service response message to operator system 120 indicating that the subscription update (and charging) was successful. The operator terminal may then display to the telephone operator that the subscription update was successful. The telephone operator may then confirm to the end user that that subscription update was successful. After the confirmation, the telephone operator may further assist the end user, or may end the operator-assisted session.

Figure 7:
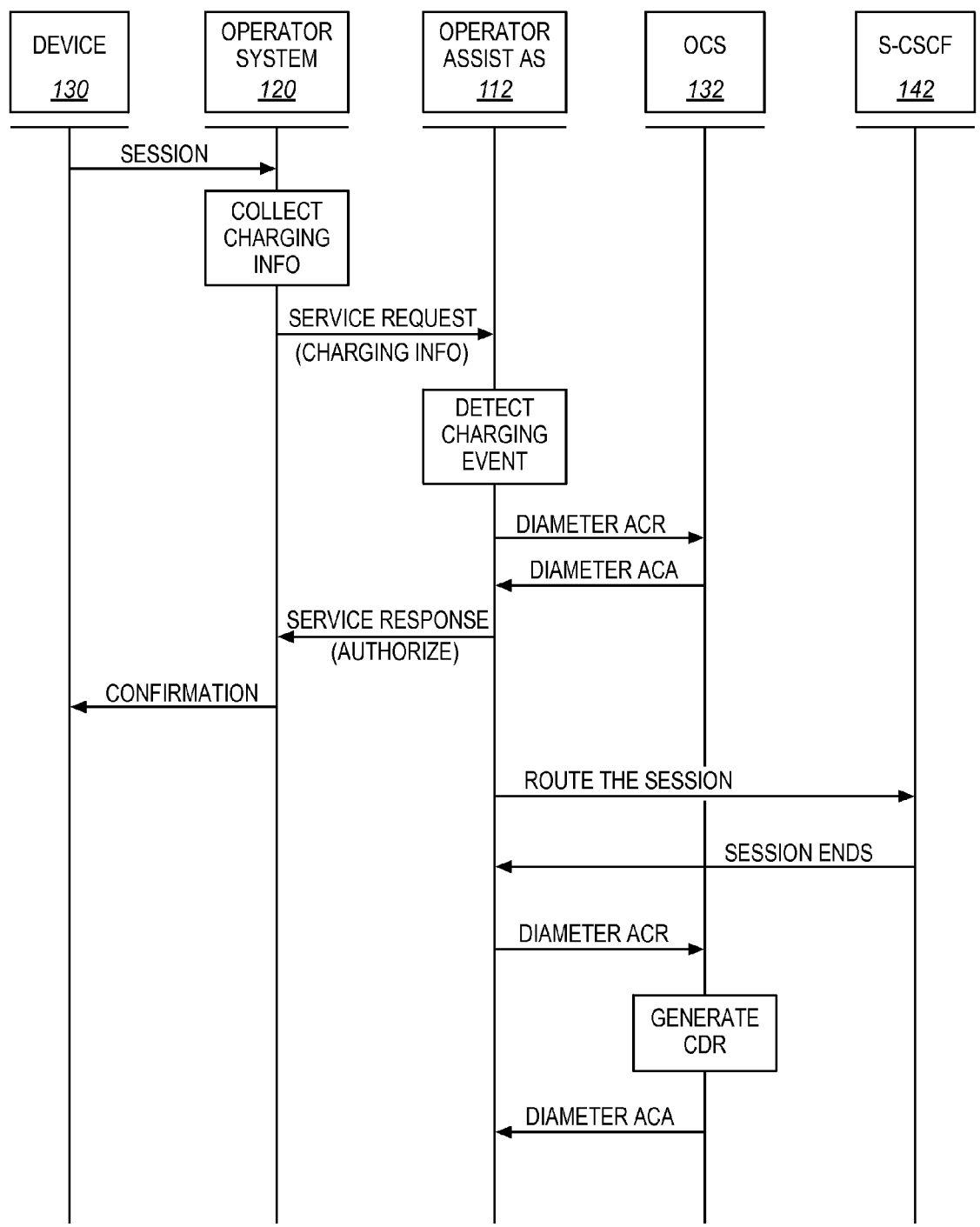
FIG. 7 is a message diagram illustrating another operator-assisted session in an IMS network in an exemplary embodiment of the invention.

FIG. 7 is a message diagram illustrating another operator-assisted session in IMS network 110 in an exemplary embodiment of the invention. Assume that an end user of device 130 (see also FIG. 1) initiates a session in IMS network 110. To initiate the session, device 130 generates a SIP INVITE and transmits the INVITE to S-CSCF 142 through the appropriate access network. S-CSCF 142 receives the INVITE, and determines that the session has failed for some reason. S-CSCF 142 then routes the INVITE to operator assistance AS 112 (often referred to a bail-out). Responsive to receiving the INVITE, interface system 114 (see FIG. 1) transmits a session initiation message to operator system 120. All of this messaging connects the session from device 130 to operator system 120, and is illustrated in FIG. 7 as an arrow labeled "session".

The telephone operator in operator system 120 establishes a communication with the end user through an operator terminal to collect charging information and other information for the session. The operator fills in the session information (calling and called party number, call type, call mode, service types, etc) into the screen provided by the operator terminal. In addition to collecting the charging information, the telephone operator also identifies a service request of the end user for the session. For example, assume for this embodiment that the end user is requesting a credit card session. The telephone operator then enters the appropriate commands into the operator terminal, and the operator terminal generates a service request message for the requested service. The service request message includes the charging information collected for the session. The operator terminal then transmits the service request message to operator assistance AS 112.

Interface system 114 (see FIG. 1) in operator assistance AS 112 receives the service request message from operator system 120, and charging function 116 detects a charging event responsive to receiving the service request message. Charging function 116 processes the charging information in the service request message to determine if the operator-assisted session utilizes prepaid charging or postpaid charging. Assume for this embodiment that postpaid charging is utilized for the operator-assisted session (i.e., the end user has a postpaid account). For postpaid charging, charging function 116 maps the charging information from the service request message into a Diameter Rf ACR [start] message, and transmits the ACR [start] message to OFCS 134.

OFCS 134 receives the ACR [start] message, and rates the service being provided based on the tariff of operator-assisted session. OFCS 134 then generates a Diameter Rf ACA [start] message indicating the charging rate, and also indicating that the service is authorized. OFCS 134 then transmits the ACA [start] message to operator assistance AS 112.

When the service is authorized, operator assistance AS 112 transmits a service response message to operator system 120 indicating that the service was authorized by OFCS 134. The operator terminal in operator system 120 may then display to the telephone operator that the service was authorized, and the telephone operator confirms to the end user that the service was authorized.

Operator assistance AS 112 then routes the session to S-CSCF 142 (or to another CSCF that is serving a called party) for subsequent routing to the called party. To route the session to S-CSCF 142, operator assistance AS 112 transmits a SIP INVITE to S-CSCF 142. S-CSCF 142 then connects the session to the called party.

At the end of the session, S-CSCF 142 transmits a SIP END to operator assistance AS 112. Charging function 116 will again detect a charging event based on the SIP END. Thus, charging function 116 generates a Diameter Rf ACR [stop] message, and transmits the ACR [stop] message to OFCS 134. Responsive to the ACR [stop] message, OFCS 134 generates or closes a Charging Data Record (CDR) for the session. More particularly, a Charging Data Function (CDF) or a Charging Collector Function (CCF) generates or closes the CDR. The CDR is then transmitted to a billing domain (not shown). OFCS 134 also transmits a Diameter Rf ACA [stop] message to operator assistance AS 112 answering the ACR [stop] message.

Although specific embodiments were described herein, the scope of the invention is not limited to those specific embodiments. The scope of the invention is defined by the following claims and any equivalents thereof.

We claim:

1. An apparatus comprising:
an operator assistance application server of an IP Multimedia Subsystem (IMS) network that is coupled to a legacy operator system of a legacy network, wherein the legacy operator system has at least one telephone station for a telephone operator to provide assistance to end users;
the operator assistance application server is also coupled to a charging system;
the operator assistance application server comprising:
an interface system operable to receive a session initiation message in Session Initiation Protocol (SIP) for an operator-assisted session in the IMS network requested by an end user, to convert the session initiation message from SIP to a legacy signaling protocol used in the legacy network before transmitting the session initiation message to the legacy operator system, to transmit the session initiation message to the legacy operator system in the legacy network to allow the legacy operator system to communicate with the end user to collect charging information for the operator-assisted session, and to receive a service request message from the legacy operator system that includes the charging information collected from the end user; and
a charging function operable to detect a charging event responsive to receiving the service request message from the legacy operator system, to generate a Diameter charging request, to map the charging information from the service request message to the Diameter charging request, and to transmit the Diameter charging request to the charging system.

2. The apparatus of claim 1 wherein the operator assistance application server further comprises a service connection system, wherein:

the charging function is further operable to receive a Diameter charging response from the charging system either authorizing or rejecting the operator-assisted session; and the service connection system is operable to initiate a requested service for the operator-assisted session if the charging system authorized the operator-assisted session.

3. The apparatus of claim 1 wherein:

the charging function is further operable to process the charging information to determine if the operator-assisted session comprises a prepaid session or a postpaid session; and if the operator-assisted session comprises a prepaid session, then the charging function is further operable to format the charging information into a Diameter Ro Credit Control Request (CCR) message, and to transmit the CCR message to an Online Charging System (OCS).

4. The apparatus of claim 3 wherein:

if the operator-assisted session comprises a postpaid session, then the charging function is further operable to format the charging information into a Diameter Rf Accounting Request (ACR) message, and to transmit the ACR message to an Offline Charging System (OFCS).

5. The apparatus of claim 1 further comprising:

the legacy operator system operable to prompt the end user for the charging information responsive to receiving the session initiation message, to collect the charging information from the end user, to prompt the end user for the service request for the operator-assisted session, and to transmit a service request message to the charging function that includes the charging information.

6. A method of providing operator assistance in an IP Multimedia Subsystem (IMS) network, the method comprising:

receiving, in an operator assistance application server of the IMS network, a session initiation message in Session Initiation Protocol (SIP) for an operator-assisted session in an IMS network;

converting the session initiation message from SIP to a legacy signaling protocol used in a legacy network before transmitting the session initiation message to a legacy operator system;

transmitting the session initiation message to the legacy operator system of the legacy network to allow the legacy operator system to collect charging information from an end user of the operator-assisted session, wherein the legacy operator system has at least one telephone station for a telephone operator to provide assistance to end users;

receiving a service request message from the legacy operator system that includes the charging information collected from the end user;

detecting a charging event responsive to receiving the service request message from the legacy operator system;

generating a Diameter charging request;

mapping the charging information from the service request message to the Diameter charging request; and transmitting the Diameter charging request to a charging system.

7. The method of claim 6 further comprising:

receiving a Diameter charging response from the charging system either authorizing or rejecting the operator-assisted session; and initiating a requested service for the operator-assisted session if the charging system authorized the operator-assisted session.

8. The method of claim 6 further comprising:

processing the charging information to determine if the operator-assisted session comprises a prepaid session or a postpaid session; and if the operator-assisted session comprises a prepaid session, then formatting the charging information into a Diameter Ro Credit Control Request (CCR) message, and transmitting the CCR message to an Online Charging System (OCS) in the IMS network.

9. The method of claim 8 further comprising:

if the operator-assisted session comprises a postpaid session, then formatting the charging information into a Diameter Rf Accounting Request (ACR) message, and transmitting the ACR message to an Offline Charging System (OFCS) in the IMS network.

10. The method of claim 6 further comprising:

prompting, in the legacy operator system, the end user for the charging information responsive to receiving the session initiation message;

collecting the charging information from the end user; and prompting the end user for the service request for the operator-assisted session.

* * * * *